F. W. HOCHSTETTER.
FRAMING DEVICE FOR MOVING PICTURE MACHINES.
APPLICATION FILED MAR. 22, 1919.
1,365,102.
Patented Jan. 11, 1921.
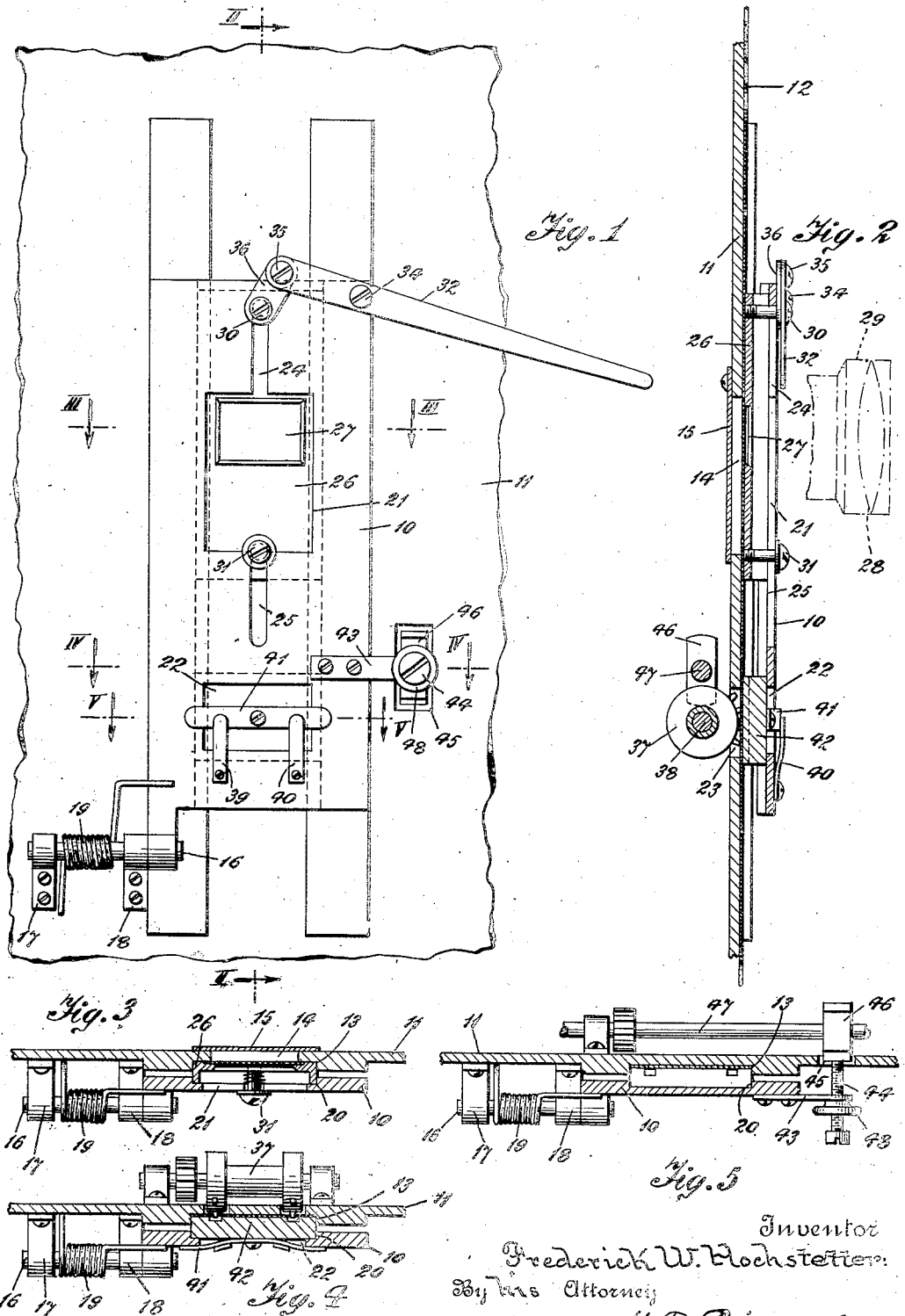
Inventor
Frederick W. Hochstetter
By his Attorney

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

FRAMING DEVICE FOR MOVING-PICTURE MACHINES.

1,365,102.  Specification of Letters Patent.  Patented Jan. 11, 1921.

Application filed March 22, 1919. Serial No. 284,388.

*To all whom it may concern:*

Be it known that I, FREDERICK W. HOCHSTETTER, a citizen of the United States, and a resident of New York, county and State of New York, have invented certain new and useful Improvements in Framing Devices for Moving-Picture Machines, of which the following is a full, clear, and exact specification.

This invention relates to a class of appliances adapted to be used in conjunction with moving picture machines.

My invention has for its object primarily to provide a framing device designed to be applied to a camera when animated pictures of objects are taken as well as being adapted to be applied to a projecting apparatus when the pictures are exhibited on a screen whereby a moving picture strip, or film may be properly exposed during its transmission to the photographic lens and to the projecting lens. The invention consists essentially of a guide adapted to be applied to a moving picture machine back of a lens, and in the guide is an adjustable slide having an aperture of a size whereby parts of predetermined dimensions of a moving picture strip when transmitted through the machine may be successively exposed to the lens as well as being movably maintained in the optical axis thereof. Other objects of the invention are to provide manually operative means for adjusting the apertured slide; and to provide means whereby the guide and the slide may be yieldingly moved intermittently to allow free transmission of the strip through the framing device.

A further object of the invention is to provide a framing device of a simple and efficient construction which is susceptible of being made for use in conjunction with moving picture machines of various types.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a fragmentary view showing a front elevation of one form of framing device applied to a moving picture machine.

Fig. 2 is a sectional view taken on the line II—II of Fig. 1, and which indicates the position of the device when in use relatively to a lens.

Fig. 3 is a detail sectional view, partly fragmentary, taken on the line III—III of Fig. 1.

Fig. 4 is a detail sectional view, partly fragmentary, taken on the line IV—IV of Fig. 1, and Fig. 5 is a detail sectional view, partly fragmentary, taken on the line V—V of Fig. 1.

The framing device has a guide, or supporting plate 10 which may be of any suitable size and shape, though the plate is preferably substantially rectangular, and when the device is employed this plate is disposed in a vertical position, as shown, on the front of the front plate, as 11, of the operating mechanism of a camera for taking moving pictures on a film, or strip, as 12, as well as being applied on the front of the front plate of the operating mechanism of a projecting apparatus for exhibiting the pictures. The front plate 11 of the moving picture machine may be of a form provided with a vertically disposed groove, as at 13, and having an exposure window 14 therethrough centrally of the groove besides being provided with a swinging plate, as 15, for closing and opening the passage through the window when desired. The lower end of the supporting plate 10 is held on a short shaft 16 which is journaled in spaced brackets 17 and 18 arranged on the front plate 11 of the machine, and encircling this shaft is a spiral spring 19 having one end engaging the front plate of the machine while the second end of the spring engages the supporting plate. The supporting plate 10 as thus hinged to the front plate of the machine will be permitted to be swung from and toward the front plate, the spring 19 normally serving to yieldingly hold the supporting plate against the front plate. In the rear surface of the supporting plate 10 is a vertically disposed groove 20 which is of a width corresponding to the width of the groove 13 of the front plate of the machine, and these grooves are in communication. Through the supporting plate is a window 21 in register with the window 14 of the front plate of the machine, and in the lower part of the supporting plate may be an opening 22 in register with an opening 23 in the front plate 11 of the machine. In the upper part of the supporting plate 10 is a slot, as 24, communicating with the upper part of the window 21 and also in the supporting plate is a second slot 25 communicating with the lower part of the window.

In the communicating grooves 13 and 20 of the supporting plate 10 and of the front plate of the machine, is a slide 26 having an aperture 27 therethrough, and this aperture is of a size corresponding to the dimension of the pictures on the film or strip. The apertured slide 26 is preferably in the form of a plate of a size whereby it may be freely adjusted upwardly and downwardly in the grooves 13 and 20 crosswise of the registered passages of the windows 14 and 21 for being arranged in the optical axis of a lens, as 28, held in a barrel, as 29, which may be provided in any suitable manner in front of the windows 14 and 21. Projecting from the upper part of the slide 26 is a bolt, or pin 30 movably disposed through the slot 24 of the supporting plate 10, while from the lower part of the slide is a bolt, or pin 31 which movably extends through the slot 25 of the supporting plate, and these bolts serve to permit the slide to be accurately guided in the grooves 13 and 20.

In order to allow the slide 26 to be manually adjusted for varying the registration of its aperture 27 with the windows 14 and 21, a lever, or handle, as 32, is provided. The lever, or handle 32 is preferably in the form of a bar which is fulcrumed, at 34, to the upper part of the supporting plate 10 for being disposed transversely of the slide, and this bar is of a length so that one of its ends is arranged above the slide while its other end extends some distance laterally with respect to the supporting plate. To the end of the bar, or handle 32 above the slide 26 is pivoted, at 35, one end of a link 36 having its other end pivotally held to the bolt 30 of the slide exteriorly of the supporting plate 10.

When the moving picture film or strip is transmitted through a camera, or projecting apparatus having this framing device applied thereon, the supporting plate 10 with the slide 26 is swung outwardly from the front plate 11 of the operating mechanism of the machine, and the strip is arranged in the groove 13 of this front plate for being transmitted back of the slide. As is incident to the operation of machines of this class the strip may be intermittently transmitted through the machine by a toothed sprocket, as 37, adapted to engage the strip at consecutive intervals, though this sprocket does not constitute a part of this invention. The sprocket 37 is held on a shaft 38 so that its teeth will be revolubly guided in the opening 28 of the front plate of the machine for engaging the moving picture strip whereby it will be intermittently transmitted so that successive parts thereof will be exposed to the photographic lens, or projecting lens through the aperture 27 of the slide 26 and through the window 21 of the supporting plate 10. By accordingly moving the lever 32 the slide 26 will be adjusted in upward and downward directions so that the aperture 27 will cause the exposure of the strip to be maintained in the optical axis of the lens.

To hold the moving picture strip in movable engagement with the sprocket 37, on the lower part of the front of the supporting plate 10 are secured the lower ends of two spaced spring fingers 39 and 40 both of which extend upwardly toward the center of the opening 22 of the supporting plate, and on the upper ends of these spring fingers is a bar 41 projecting across the center of the opening. To the bar 41 is connected a block, as 42, disposed back of the supporting plate 10 so as to yieldingly contact with the moving picture strip for releasably holding it on the teeth of the sprocket.

Serving as means to intermittently swing the guide, or supporting plate 10 in spaced relation to the front plate 11 of the machine for allowing the moving picture strip to be freely transmitted through the framing device, projecting laterally from the support plate is a bar 43 having a threaded opening in its free end in which is screwed a threaded bolt, as 44, and one end of this bolt is adjustably disposed in an opening 45 provided in the front plate 11 of the machine for being engaged at intervals by the ends of a substantially rectangular cam, or block, as 46, held on a shaft 47 which is rotated by the operating mechanism of the machine, not shown, so as to contact with the bolt 44 simultaneously with the engagement of the teeth of the sprocket 37 with the strip. The contacting of the cam 46 with the bolt 44 will cause the supporting plate 10 with the slide 20 to be spaced from the front plate of the machine at intervals, and the strip will then be freely moved by the sprocket. When the bolt 44 is properly adjusted for being contacted by the cam 46 it is releasably held in the bar 43 against accidental movement by a finger nut 48 adjustably arranged on the bolt in front of this bar. Thus a framing device is provided for use on a camera when moving pictures are taken as well as being adapted for use on a projecting apparatus when the pictures are exhibited on a screen whereby a moving picture strip, or film may be transmitted so that successive parts of predetermined dimensions may be successively exposed to the lens as well as being movably maintained in its optical axis.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. The combination with the front plate of a moving picture machine having a window therein, of a guide plate having a window opposite the window of said front plate, a picture framing slide carried by said guide plate, means pivotally connecting the lower end of said guide plate to said front plate whereby said guide plate may swing in a vertical plane toward and away from said front plate, yieldable means to normally hold said guide plate vertically parallel with said front plate, means associated with said guide plate and said front plate for intermittently swinging said guide plate away from said front plate against the action of said yieldable means, said last named means including a rotatable cam, and a screw carried by said guide plate adjustable toward and away from said cam to vary the distance at which the guide plate is swung from said front plate.

2. The combination with the front plate of a moving picture machine having a window therein, of a guide plate having a window opposite the window of said front plate, a picture framing slide carried by said guide plate, means pivotally connecting the lower end of said guide plate to said front plate whereby said guide plate may swing in a vertical plane toward and away from said front plate, yieldable means to normally hold said guide plate vertically parallel with said front plate, means associated with said guide plate and said front plate for intermittently swinging said guide plate away from said front plate against the action of said yieldable means, said guide plate being provided with longitudinal elongated slots extending upwardly and downwardly from the upper and lower edges respectively of the guide plate window, and pins rigidly carried by said slide and guided in said slots.

3. The combination with the front plate of a moving picture machine having a window therein, of a guide plate having a window opposite the window of said front plate, a picture framing slide carried by said guide plate, means pivotally connecting the lower end of said guide plate to said front plate whereby said guide plate may swing in a vertical plane toward and away from said front plate, yieldable means to normally hold said guide plate vertically parallel with said front plate, means associated with said guide plate and said front plate for intermittently swinging said guide plate away from said front plate against the action of said yieldable means, said guide plate being provided with longitudinal elongated slots extending upwardly and downwardly from the upper and lower edges respectively of the guide plate window, pins rigidly carried by said slide and guided in said slots, a link pivoted at one end to the upper pin of said slide, and a lever pivoted between its ends to said guide plate and having its inner end pivotally connected to the other end of said link whereby manual operation of said lever will cause movement of said slide relative to said guide plate.

4. The combination with the front plate of a moving picture machine having a window therethrough and provided with a vertically disposed film strip guiding groove, of a vertically disposed elongated guide plate hinged at its lower end upon a horizontal axis to the inner side of said front plate and provided with a vertical groove communicating with the groove of said front plate, said guide plate having a window opposite the window of the front plate, a picture framing slide disposed between said guide plate and said front plate within the grooves thereof for movement vertically relative to said guide plate, and means to vertically move said slide.

5. The combination with the front plate of a moving picture machine having a window therethrough and provided with a vertically disposed film strip guiding groove, of a vertically disposed elongated guide plate hinged at its lower end upon a horizontal axis to said front plate and provided with a vertical groove communicating with the groove of said front plate, said guide plate having a window opposite the window of the front plate, a picture framing slide disposed between said guide plate and said front plate within the grooves thereof for movement vertically relative to said guide plate, means to vertically move said slide, means to yieldably normally maintain said guide plate vertically disposed parallel with said front plate, and means to intermittently swing said guide plate away from said front plate against the action of said yieldable means.

6. The combination with the front plate of a moving picture machine having a window therein, of a film confining gate having a window opposite the window of said front plate and pivotally connected at its lower end to said front plate whereby said gate may swing in a vertical plane toward and away from said front plate, yieldable means to normally hold said gate vertically parallel with said front plate, and means associated with said gate and said front plate for intermittently swinging said gate away from said front plate against the action of said yieldable means, said last named means being adjustable to vary the distance at which the gate is swung from said front plate.

This specification signed and witnessed this 21 day of March A. D. 1919.

FREDERICK W. HOCHSTETTER.

Witnesses:
J. FREDERICK CRYER,
D. KOEPER.